United States Patent [19]

Stage

[11] Patent Number: 4,601,790
[45] Date of Patent: * Jul. 22, 1986

[54] PROCESS FOR DEODORIZING AND/OR PHYSICAL REFINING OF COCOA BUTTER AND COCOA BUTTER SUBSTITUTES

[76] Inventor: Hermann Stage, Ludgeristrasse 9, 4400 Münster, Fed. Rep. of Germany

[*] Notice: The portion of the term of this patent subsequent to Jul. 8, 2003 has been disclaimed.

[21] Appl. No.: 514,905

[22] Filed: Jul. 18, 1983

[30] Foreign Application Priority Data

Jul. 29, 1982 [DE] Fed. Rep. of Germany ....... 3227669
Jun. 27, 1983 [DE] Fed. Rep. of Germany ....... 3323120

[51] Int. Cl.$^4$ .............. B01D 1/22; C09F 5/10
[52] U.S. Cl. ........................... 203/6; 203/72; 203/79; 203/88; 203/92; 159/13.4; 159/16.3; 159/18; 159/49; 202/176; 202/185 A; 260/428; 426/488; 426/492
[58] Field of Search ............ 203/72, 89, 92, 93, 203/95-97, 88, 100, 6, 34, 29, 78, 79, 80; 159/13 A, 13 B, 13 R, 16.3, 49, 8, 14, 13.4; 426/488, 492, 487; 260/428; 202/236, 173, 176, 205, 234, 233, 237, 185, 183, 184

[56] References Cited

U.S. PATENT DOCUMENTS

| | | | |
|---|---|---|---|
| 2,150,683 | 3/1939 | Hickman | 203/6 |
| 2,368,669 | 2/1945 | Lee et al. | 203/79 |
| 2,621,196 | 12/1952 | Thurman | 203/79 |
| 2,999,795 | 9/1961 | Yagi et al. | 159/18 R |
| 3,232,847 | 2/1966 | Hoff | 159/18 R |
| 3,503,854 | 3/1970 | Good | 203/72 |
| 3,737,378 | 6/1973 | Mori et al. | 203/89 |
| 4,036,865 | 7/1977 | Hartmann et al. | 203/79 |
| 4,211,610 | 7/1980 | McGowan | 202/177 |
| 4,394,221 | 7/1983 | Stage et al. | 203/89 |

FOREIGN PATENT DOCUMENTS 74691 12/1960 France ............... 159/18 R

Primary Examiner—Wilbur Bascomb
Attorney, Agent, or Firm—Pollock, Vande Sande & Priddy

[57] ABSTRACT

Deodorizing and/or physical refining of cocoa butter and cocoa butter substitutes is carried out in accordance with the principle of continuous counter-current falling film stripping steam distillation in at least two different zones, where different flow and current conditions prevail for the liquid film and the vapors, respectively. In the initial zone 10 the vapors pass through trickle passages having a hydraulic equivalent diameter greater than the hydraulic equivalent diameter in the final zone 22.

The working pressure in the top of the falling film column 10 is maintained below 2.0 mbar, and in the bottom of the falling film column 22 it is maintained by at most 1.6 mbar in excess of that in the falling film column 10. The accumulation of any significant liquid content in the bottoms of the serially operating zones is avoided. Stripping steam is supplied in an amount of 2 to 10 kg of steam per 100 kg of charged liquid.

24 Claims, 7 Drawing Figures

PROCESS FOR DEODORIZING AND/OR PHYSICAL REFINING OF COCOA BUTTER AND COCOA BUTTER SUBSTITUTES

The invention relates to the deodorizing and/or physical refining of cocoa butter and cocoa butter substitutes. For this purpose, the invention provides a novel process and a novel apparatus for carrying out the process.

In particular, the invention relates to a process of deodorizing and/or physically refining high-boiling liquids according to the principle of continuous countercurrent falling film stripping steam distillation in an externally imposed temperature field, in which the heated liquid flows down as a thin film having a film thickness of less than 1 mm along the walls of vertically arranged surfaces forming trickle passages, of which at least a part is maintained at a higher temperature than the downflowing liquid, and in which steam is supplied exclusively to the bottom of the final zone and is passed in countercurrent flow through said trickle passages.

A process of this kind and an apparatus for carrying out the process are known from the German Laid-Open Patent Application No. 29 14 101. The prior known single-stage process operating in a single countercurrent falling film stripping steam distillation zone for deodorizing and/or physically refining high-boiling compounds, especially of edible oils, is not suited for the physical refining of cocoa butter, because in accordance with the single embodiment thereof the crude oil is charged at a temperature of 250° C. to the distributor plate in the top of the column.

Furthermore, in the German Patent Application No. P 32 27 669.9—the priority of which is claimed—a process of this kind has been proposed, in which at least two serially operating countercurrent falling film stripping steam distillation zones, which are in vapor and liquid communication, are provided, of which the final zone which is disposed downstream in the direction of the downflowing liquid has smaller trickle passage hydraulic equivalent diameters, or the equivalent thereof in case of non-tubular trickle passages, than the upstream initial zone.

As the high-boiling liquids edible oils, fats and esters are considered here, which are sufficiently stable to be charged at a temperature ranging from 220° to 280° C. to the head of the initial zone. It is an objective of the prior proposal to reduce as far as possible the amount of stripping steam required, and in the field it was possible to achieve a stripping steam requirement of 3 to 5 kg of steam per ton of crude oil.

It is impossible to conduct the deodorizing and/or physical refining of cocoa butter under these conditions, because transesterifications and other significant changes of the glyceride structure would occur.

The content of the mentioned German Patent Application No. P 32 27 669.9 of July 23, 1982 is incorporated herein by reference this is helpful and necessary.

Cocoa butter, which is obtained from cocoa beans, has crystallization and melting characteristics which are excellently adapted to the temperature of the human body, which is due to a quite specific triglyceride structure of the fatty acid radicals constituting this fat, provided the cocoa butter has not been thermally and/or oxidatively overstrained in the course of being processed.

Cocoa butter is used to a large extent in the manufacture of chocolate, as an ointment base, and in the manufacture of suppositories. The raw material obtained from cocoa butter is scarce and expensive. By combined transesterification and crystallization processes it has been possible to prepare cocoa butter substitutes also from other crude oils and fats, such as, palm oil or tallow, which substitutes have crystallization and melting characteristics that are comparable to those of cocoa butter obtained from cocoa beans. Within the scope of the present application "cocoa butter substitutes" means such fats as melt in the range between 30° and 42° C.; in the first place, this means edible fats, especially those suitable in the manufacture of chocolate. Even if "cocoa butter" is briefly mentioned hereinbelow, this term shall include—in addition to the genuine cocoa butter obtained from cocoa beans—also these other fats which are defined above as "cocoa butter substitutes".

All of the crude fats suitable as cocoa butter normally have a more or less high content of free fatty acids and other volatile components which unfavorably influence aroma and taste; this content has to be removed by special refining processes prior to the use as chocolate fat. In the chemical refining processes used so far this removal causes, on the one hand, disproportionately high fat losses due to the conversion of the free acids by means of alkalis into the alkali soaps which are readily removed, and, on the other hand, excessive pollution load which is no longer permitted under present environmental laws. Basically, the purely distillative removal of the specified companion substances without the prior chemical conversion thereof under the conditions of physical refining, which is common with other edible oils and fats in accordance with the process of stripping steam distillation at pressures between 2.6 and 13 mbar in a temperature range between 220° and 270° C., would be possible; but under these conditions this would result in a significant change of the glyceride structure and would deteriorate the product quality because of the already mentioned change of the crystallization and melting characteristics. Therefore, there is still a demand for a gentle process for the physical or distillative deodorizing and/or refining of cocoa butter and cocoa butter substitutes, which process should not significantly change the glyceride structure of the starting materials.

Proceeding therefrom, it is the object of the present invention to improve the process and the apparatus known from the DE-OS No. 2,914,101 and to adapt the same to the deodorizing and/or physical refining of cocoa butter and cocoa butter substitutes.

SUMMARY OF THE INVENTION

In particular, the improvement of the process of the present invention resides in that the following conditions are maintained for deodorizing and/or physically refining cocoa butter and cocoa butter substitutes:

(a) at least two serially operating countercurrent falling film stripping steam distillation zones in vapor and liquid communication with one another are used, of which the final zone disposed downstream in the direction of the downflowing liquid has smaller trickle passage hydraulic equivalent diameters, or the equivalent thereof in case of non-tubular trickle passages, than the upstream initial zone;

(b) the liquid is charged at a temperature ranging from 150° to 200° C. to the top of the initial zone, where appropriate after previous degasification, dehydration and degumming;
  (c) in the bottom of the final zone the temperature of the physically refined and/or deodorized product is not more than 10° K. above the charging temperature to the initial zone, to which end the inlet temperature of the heating medium, which is passed in countercurrent flow or cross-countercurrent flow to the downflowing liquid film, in no case exceeds the discharge temperature of the film by more than 10° K. and is maintained below 205° C.;
  (d) in the top of the initial zone the working pressure is maintained below 2.0 mbar, and in the bottom of the final zone it is maintained at no more than 1.6 mbar in excess of that in the initial zone;
  (e) in the liquid collectors of the serially operating zones the formation of any significant liquid level is avoided; and
  (f) the stripping steam is supplied in an amount of from 2 to 10 kg of steam per 100 kg of liquid charge.

The treatment in two or more stages is based on the surprising observation that the physical refining and/or deodorizing of cocoa butter in accordance with the principle of continuous countercurrent falling film stripping steam distillation in an externally imposed temperature field does not take place linearly. In most cases the cocoa butter to be physically refined has a proportion of free fatty acids and other high-boiling components in the range of about 5% by weight. To reduce the proportion of the components to be removed, which are substantially more highly volatile than cocoa butter, to about 10% of their initial content only two theoretical separating stages are required at most, which at the mentioned working conditions may already be achieved with an exchange length of 2 to 6 m in flow passages having a hydraulic equivalent diameter ranging from 120 to 150 mm. Preferably, in this initial zone an exchange length of about 3 to 5 m will already be sufficient.

For the removal of the remaining residual impurities except for a residual acid content of less than 0.1% by weight, preferably less than 0.05% by weight, six to eight theoretical separation stages are required in the final zone, which is provided downstream; under the mentioned conditions these separating stages may well be realized with flow passages having a hydraulic equivalent diameter of less than 120 mm, preferably 80 mm, the exchange length ranging from 4 to 10 m, preferably being approximately 8 m. Preferably, the final zone is subdivided into two sub-zones; the first sub-zone of the final zone, which is adjacent the initial zone, has trickle passage diameters of from 80 to 120 mm, and the second sub-zone has trickle passage diameters of less than 80 mm, preferably about 50 mm. The redistribution of the oil to the trickle passages of the final zone, especially to the trickle passages of the sub-zones of the final zone, further increases the efficiency of the residual physical refining taking place therein.

Although a necessarily two-stage and possibly even three-stage treatment initially does not lend itself to the deodorizing and/or physical refining of sensitive substances such as cocoa butter, it has been recognized within the scope of the present invention that under predetermined working conditions of pressure, temperature and residence time said earlier process according to the principle of continuous countercurrent falling film stripping steam distillation in an externally imposed temperature field and in at least two serially operating countercurrent falling film stripping steam distillation zones, which are in vapor and liquid communication, is also suitable for the gentle deodorizing and/or physical refining of cocoa butter and cocoa butter substitutes and, surprisingly, does not cause any changes in the glyceride structure of the starting material. These predetermined working conditions include in particular the temperature of the crude fat upon charging thereof onto the distributor in the top of the initial zone, and further the temperature upon discharge of the product from the bottom of the final zone, the working pressure in the top of the initial zone and in the bottom of the final zone, the residence time, and the Reynold's number of the liquid film, as will be specified in detail hereinbelow.

The process of the invention is particularly suited for the physical refining of cocoa butter and cocoa butter substitutes. Simultaneously with the physical refining also deodorizing takes place. On the other hand, the process of the invention may also be used exclusively for deodorizing if, for instance, deacidification or refining has already been performed otherwise, e.g. chemically. If merely deodorizing is intended, an existing system permits an increased flow rate with substantially maintained process parameters. The process of the invention will be explained with particular reference to physical refining (automatically coupled with deodorizing). The required modifications for exclusive deodorizing may readily be made by those skilled in the art and are particularly directed to an increased flow rate, a slightly greater film thickness of the liquid film, and possibly higher Reynold's numbers of the liquid.

The cocoa butter to be treated is heated in a first upstream heat exchanger—which preferably utilizes the heat of the countercurrent flow of the hot finished fat—to a temperature of about 140° to 180° C., thereupon it is heated in the high-temperature heat exchanger to the working temperature of 150° to 200° C. and is charged into the initial zone at this temperature. Preferably, the crude fat is charged onto the distributor in the initial zone at a temperature of 160° to 190° C., most preferably at a temperature of 180° to 190° C.

In the course of the overall process the temperature of individual particles of the liquid film shall not exceed 200° C. The temperature of the heating medium, which is passed either in countercurrent or cross-countercurrent flow, has to be controlled with corresponding care.

The temperature of the heating medium, which is e.g. high-temperature oil, must not exceed the film discharge temperature by more than 10° K. and shall preferably be, less than 5° K. in excess of said film discharge temperature. In any case the inlet temperature of the heating medium must not be in excess of 205° C., preferably it shall not exceed 195° C.

Basically, the heating medium has to compensate for heat losses of the liquid film caused by evaporation of fatty acids and other high-boiling components and has to contribute to the continuous renewal of the liquid film surface. In the initial zone the temperature of the trickle passage walls may be maintained by no more than 10° K., preferably by about 2° to 4° K. in excess of the film discharge temperature, because in this zone the principal stripping work is performed. In the final zone, the temperature of the trickle passage walls should essentially correspond to the film discharge temperature.

At the bottom of the final zone the temperature of the physically refined and/or deodorized product is at most 10° K., preferably at most 5° K., in excess of the charging temperature to the initial zone.

Due to the comparatively low working temperatures ranging from 150° to 200° C. for such a high-boiling substance as cocoa butter, a particularly low working pressure and a comparatively large amount of stripping steam are required for effective physical refining. The working pressure in the top of the initial zone is kept below 2.0 mbar, preferably below 1.8 mbar, and at the bottom of the final zone it exceeds this working pressure of the initial zone by no more than 1.6 mbar, preferably by less than 1.2 mbar. Thus, the process according to the invention is not only performed at a very low working pressure but also with an exceedingly low pressure loss. The reduction of the pressure loss is promoted by the use of trickle passages having a relatively large trickle passage diameter, the avoidance of any significant liquid levels in the liquid collectors of the processing zones and—where appropriate—a pre-purification of the crude fat which in case of particularly high proportions of free fatty acids and other high-boiling components may be supplemented by a flash treatment, as will be set out in detail hereinbelow.

The stripping steam is supplied in an amount of 2 to 10, preferably of 3 to 8 kg of steam per 100 kg of charged liquid. Preferably, so-called super-pure steam is used, which is obtained from previously distilled and degasified water. The stripping steam is supplied exclusively to the bottom of the final zone—in case of a two-zone type final zone it is supplied to the bottom of the second (last) sub-zone. Preferably, prior to being supplied to the bottom of the final zone, the temperature of the stripping steam is adjusted to the temperature prevailing therein, whereby the control of the working pressure is facilitated.

At the low treatment temperatures of less than 200° C. the viscosity of the cocoa butter is comparatively high; at the preferred temperature range of between 160° and 190° C. the viscosity is approx. 0.004 to 0.0013 Pa s, whence there results a rate of fall of the liquid film in the range between about 0.25 and 0.6 m/sec. To ensure at least 8 to 10 separating stages, trickle passage lengths of at least 6 m are required under the selected conditions, resulting in residence times of about 20 to 30 sec. for individual liquid particles in the countercurrent falling film stripping steam distillation zones. On the other hand, it has been recognized within the scope of the present invention that the total residence time of liquid particles in the high-temperature range at temperatures ranging from 150° to 200° C. should not exceed about 40 sec. in order to prevent a change of the specific triglyceride structure. For this reason a hold-up vessel such as commonly employed in the prior art for bleaching the product must by no means be provided, and any even temporary accumulation of significant quantities of liquid in the bottoms of the treatment zones has to be avoided. To this end, the lower liquid collectors of the film stages are arranged and designed in such a way that upon continuous liquid supply to the falling film tubes of a film stage the level of the liquid discharged therefrom into the lower collector builds up only in the conduit installed at the lowest point thereof with a downward inclination, from which point it further extends at an inclination to the liquid distributor of the subsequent film stage or the pump receiver, respectively, of the last stage, so that the liquid content remaining herein finally results only from the wetting of the existing walls.

The acceptable pressure loss in the final zone is decisive for the overall circumferential length of the trickle passages therein. In the farther upstream initial zone, the overall circumferential length of the trickle passages has to be at least equal, but preferably it is dimensioned with ever increasing length from one zone to the next so that the zone adjacent the liquid charge inlet has the greatest overall circumferential length. The upper limit for the overall circumferential length in this zone is selected so that the Reynold's number of the liquid therein is no less than 50 and preferably is no less than 100.

In accordance with the invention especially favorable flow and exchange conditions are obtained for the liquid film, on the one hand, and the flow of vapors, on the other hand, when the liquid flow rate through each zone is substantially equal and in case of physical refining ranges from 0.4 to 1.6 $m^3$ and preferably from 0.7 to 0.9 $m^3$ of liquid per hour per each m of the overall circumferential length of the trickle passages. If merely deodorizing is to be carried out according to the process of the invention—for instance because the liquid has already been chemically refined—higher values may be provided; in that case the liquid flow rate may range from 0.8 to 2.4 $m^3/m$ h and preferably from 1.4 to 1.8 $m^3/m$ h.

On the basis of these values of the load on the trickle passage walls and under consideration of the above explanations relating to the overall circumferential length, the film thickness of the liquid film is preferably maintained in the range from 0.35 to 0.55 mm. In the final zone the film thickness of the liquid film may be slightly greater.

The Reynold's number of the liquid film is kept in excess of 50 and preferably ranges between 100 and 180. In accordance with a further aspect of the invention the flow conditions provided in the initial zone, the final zone, and possibly also the sub-zones of the final zone are such that the liquid film trickling down has ever increasing Reynold's numbers from one zone to the next. These Reynold's numbers of the liquid are opposed by Reynold's numbers of the vapor flow of at least 700. The vapor flow may have Reynold's numbers of up to about 5,000. In contrast to the conditions pertaining for the liquid film, the vapors have lower Reynold's numbers in a subsequent treatment zone than in the preceding zone.

Depending on its origin, its age, the conditions of storage and the like, the cocoa butter to be physically refined has a higher or lower content of free fatty acids ranging from about 1 to 5%. In addition to that, such crude fats contain about 0.05 to 0.3% by weight of water and 0.01 to 0.1% by weight of other higher-boiling components that may be separated by distillation. Before such crude fats are heated to the processing temperature and are supplied to the process according to the invention, degumming and degasification and partial dehydration are preferably carried out in a pre-treatment stage.

According to a further aspect of the invention degasification takes place at relatively low temperatures ranging from 40° to 100° C. and preferably from 60° to 80° C., and at a working pressure ranging from about 100 to 280 mbar and preferably from 120 to 200 mbar. Under these conditions the crude fat is sufficiently degasified but is not completely dried. Rather, there remains in the crude oil a residual proportion of dissolved water ranging from 0.05 to 0.2% by weight, which is liberated only under the working conditions in the subsequent initial zone of the countercurrent falling film stripping steam distillation zones at the working pressure of less than 2.0 mbar provided therein and at a temperature of the liquid film ranging from 150° to 200° C. and preferably from 160° to 190° C. The water vapor liberated under these conditions from the liquid film additionally acts as stripping steam, promotes the surface renewal of the liquid film in the initial zone, and also increases the Reynold's number of the liquid therein. If therefore the crude fat is charged to the initial zone in a degasified state but with a water cpntent of about 0.05 to 0.2% by weight, this will significantly improve the mass transfer as compared to a downflowing film of an anhydrous liquid. The vapors liberated in the degasification stage are preferably also supplied past the first portion of the vacuum system including the respective compression stages to a jet condenser of corresponding pressure, where they are condensed by means of normal cooling water so as to avoid any additional load on the compression portion.

Under certain prerequisites, e.g. when cocoa butter stored under detrimental conditions is processed or certain cocoa butter substitutes are processed, the content thereof of free fatty acids and other high-boiling components may take such values, e.g. up to about 10% by weight and more, that at the provided working conditions—temperature up to 200° C., working pressure less than 2.0 mbar—the compositions will boil already without the addition of stripping steam.

According to a further aspect of the invention this observation is utilized by carrying out a flash treatment prior to the introduction of the crude fat into the initial zone. For this purpose a flash vessel may be provided to which the crude fat that has been heated to the working temperature is charged. The working temperature in the flash vessel is practically the same as that in the initial zone (less than 2.0 mbar), to which end the flash vessel is suitably connected at the top to the jet condenser connected upstream of the vacuum-producing system. Advantageously, the flash vessel is disposed above the distributor in the top of the initial zone so that the flashed crude fat—without use of a pump—reaches the distributor merely under the action of its own weight from the bottom of the flash vessel. By means of such flashing—which is carried out without the supply of stripping steam—the proportion of free fatty acids and other high-boiling components in the crude fat may be decreased to about 2 to 4% by weight. It is obvious that such a flashing results in a reduced stripping steam requirement and thus also in a saving of energy in the vacuum-producing system.

Such a flashing step may be provided in addition to the preceding degumming, degasification and partial dehydration.

The quality of the finished fat may be further improved by a per se known addition of complexing agents to the bottom of the final zone or to the discharged and already further cooled product. Such complexing agents mainly serve to complex metal ions which are always present in small amounts and have an oxidation-promoting effect. To this end the addition of e.g. citric acid in a quantity of 5 g per ton of product to the bottom of the final zone has proved effective. Other suitable complexing agents are tartaric acid, phosphoric acid, ascorbic acid, lactic acid and the like. Insofar as such complexing agents are detrimentally affected already at the bottom temperature, they should suitably be added after cooling of the finished oil to temperatures of less than about 100° C. by heat exchange with the newly supplied crude cocoa butter to be physically refined.

In accordance with an important aspect the supply of stripping steam takes place only to the bottom of the final zone—in case of a two-zone-type final zone exclusively to the bottom of the second (last) sub-zone. This provides for optimum conditions for the stripping of the residual content of fatty acids. Furthermore, it is thereby possible to maintain the temperatures required for mass transfer in the bottom of said final zone at the lowest possible level. Finally, this measure ensures throughout all of the zone a genuine countercurrent principle with the highest possible concentration of the fatty acids in the vapor, so that, based on anhydrous substances, the vapor exiting from the top of the column consists of more than 95% of free fatty acids and of less than 3% of the triglycerides of the treated cocoa butter.

Below, the apparatus for carrying out the process of the present invention is described by means of preferred embodiments thereof with reference to the drawings, in which:

DETAILED DESCRIPTION OF THE DRAWING

Figure 1:
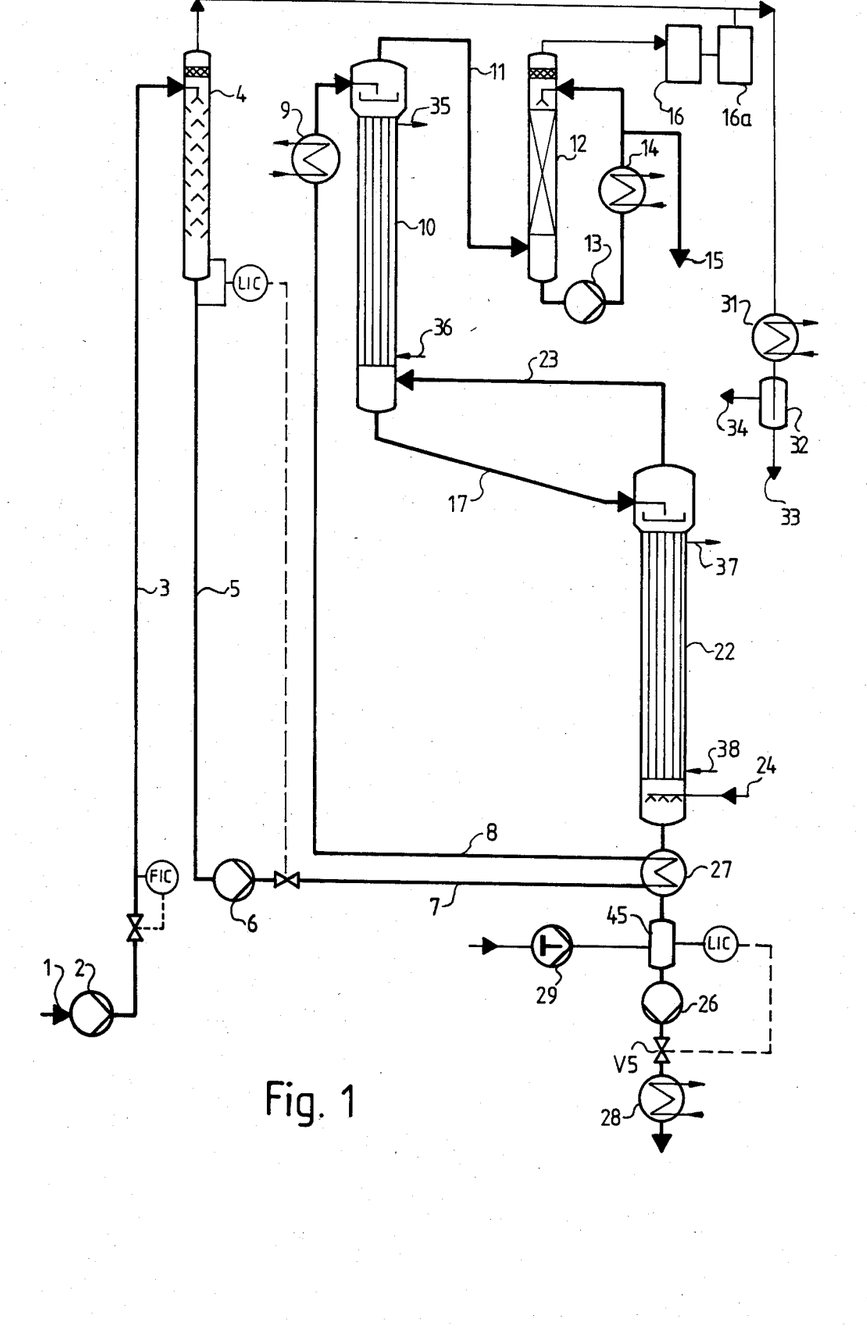
FIG. 1 is a flow diagram with two countercurrent falling film stripping steam distillation zones for carrying out the process according to the invention.

As is apparent from FIG. 1, the overall apparatus for deodorizing and/or physical refining—apart from the usual component parts of such apparatus like tubings, pumps, armatures, control means and the like not mentioned in detail—in the principal parts mainly comprises the degasification stage 4, the heat exchangers 27 and 28, a first falling film column 10, the jet condenser 12 with a cooler 14 disposed in the circulation line to the vacuum-producing system 16, 16a, the final falling film column 22 having its top in liquid communication via the line 17 and in vapor communication via the line 23 to the bottom of the falling film column 10, and the stripping steam supply means 24.

In particular—as is apparent from FIG. 1—the crude fat is taken from a storage tank at a temperature of 60° C. and is supplied through the pump 2 via the line 3 to the top of the degasification stage 4. The degasification stage 4 is operated at a working pressure of e.g. 200 mbar. The liquid level controller in the bottom of the degasification stage 4 ensures a correspondingly high liquid head at the intake side of the delivery pump 6, which is connected downstream through the line 5, which liquid head always ensures a slight overpressure in the pump 6. It is thereby possible to prevent—even if the less expensive pumps provided with glands are used for the delivery pump 6—atmospheric oxygen from re-entering the already degasified liquid.

The delivery pump 6 supplies the liquid fat via the line 7 to a heat exchanger 27, where the degasified, but still water-containing fat is heated by heat exchange with the product withdrawn from the bottom of the final falling film column 22. The fat preheated in the heat exchanger 27 is supplied via line 8 to the high-temperature heat exchanger 9, where heating to the working temperature takes place by heat exchange with a high-temperature heating medium.

Figure 1A:
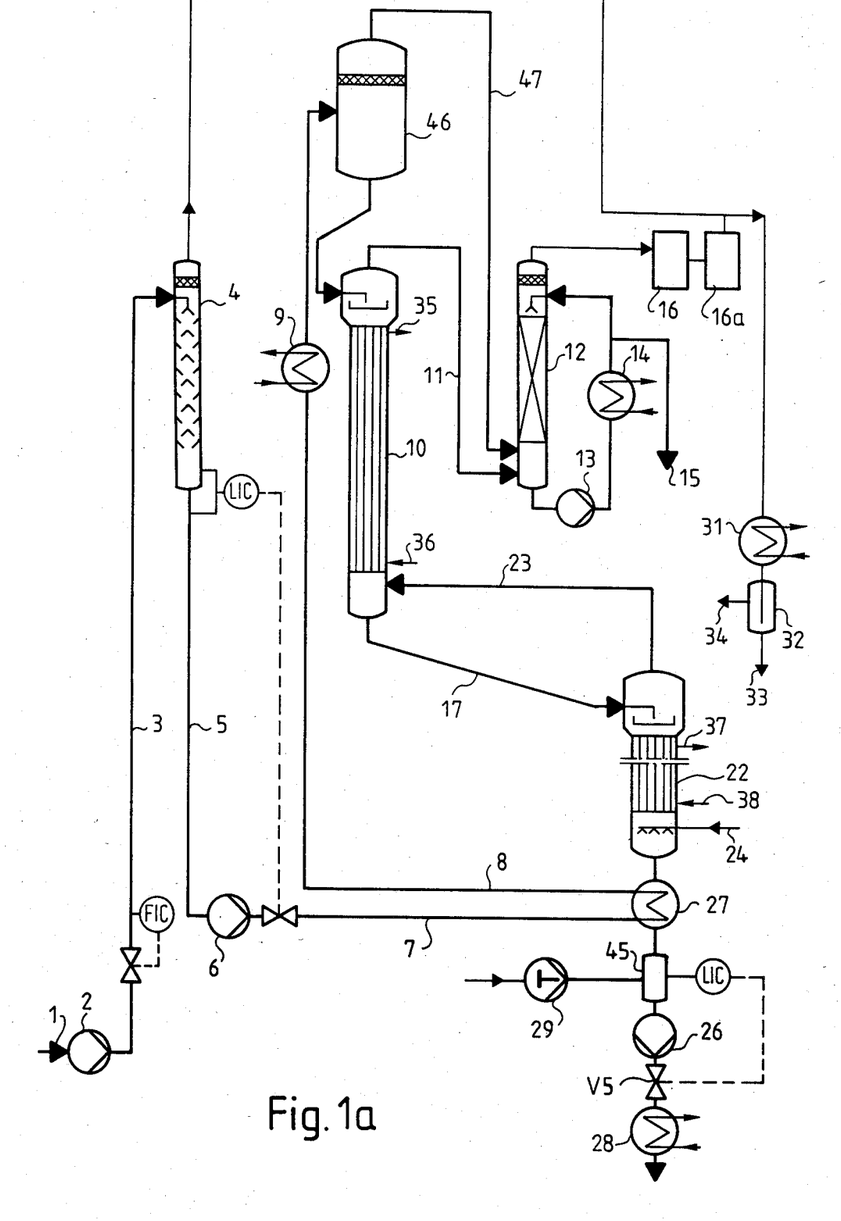
FIG. 1a is a flow diagram similar to FIG. 1 but having a flash vessel additionally incorporated therein.

As will be apparent from FIG. 1a, a flash vessel may be disposed between the high-temperature heat exchanger 9 and the falling film column 10, the top of said flash vessel being connected via line 47 to the bottom of the jet condenser 12. If required, the flash vessel 46 may be heated by the heating medium supplied to the high-temperature heat exchanger 9 (this is not indicated in the drawing). From the bottom of the flash vessel 46 the flashed crude fat reaches the distributor in the top of the falling film column 10.

The crude fat, which has been heated to the working temperature in the high-temperature heat exchanger 9, is charged either directly—or via the flash vessel 46 interposed therebetween—to the distributor disposed in the top of the first falling film column 10. This distributor, as well as the further distributors, is provided with small vapor passage tubes (not shown) of suitable dimensions to pass the vapors from one zone to the next with a minimum of pressure drop (e.g. less than 0.008 mbar). Within this falling film column 10 the initial zone of the countercurrent falling film stripping steam distillation zones is realized. According to an important aspect of the present invention this initial zone is to ensure approximately two theoretical separating stages, which may well be realized under the specified conditions with a falling film column 10 the trickle passages of which have a hydraulic equivalent diameter ranging from 120 to 150 mm or the equivalent thereof in the case of non-tubular trickle passages, and, a length ranging from 2 to 6 m a preferable from about 3 to 4 m. For instance, indirectly heated tube bundle columns in which the liquid film trickles down the inner tube walls are well suited. In the embodiment described with reference to FIG. 1, the falling film column 10 has disposed therein a tube bundle including 8 tubes (inner diameter 133 mm, length 3 m) down the inner walls of which the liquid film flows. In that case the inner diameter corresponds directly to the hydraulic equivalent diameter of the trickle passage. As is well known, according to Prandtl the "hydraulic equivalent diameter" $r_h$ of a trickle passage is defined to be $$r_h = F/U$$

where F=cross-sectional area and U=the wetted cross-sectional circumference (cf. "Führer durch die Strömungslehre" by Ludwig Prandtl, published by Verlag Friedrich Vieweg & Sohn, Braunschweig, 1942, p. 145).

For non-tubular trickle passages the equivalent of the hydraulic equivalent trickle passage diameter can be derived according to known equations as specified, for instance, by Bruno Eck in "Technische Strömungslehre", published by Springer Verlag, Berlin, 1949, p. 109, according to which the hydraulic equivalent diameter of a flow or trickle passage having non-circular cross-section is determined from the equivalent of the cross-sectional area in the sense of $$d = (4 \cdot F)/U$$

where:
d=hydraulic equivalent diameter of the non-circular trickle passage;
F=cross-sectional area of the non-circular trickle passage; and
U=circumference of the non-circular trickle passage.

Inside the falling film column 10, a heating medium supplied from a predetermined source through the connecting member 36 and discharged through the connecting piece 35 flows around each individual tube of the tube bundle. Within the provided temperature range the heating medium used may be high-pressure steam or a high-temperature oil such as "HT oil" (higher aromatic compounds), wherein the use of the high-temperature oil produces a temperature gradient on the side of the heating medium and is therefore preferred.

The mixture of contaminated stripping steam, free fatty acids separated from the crude fat and from other high-boiling components accumulating in the top of the falling film column 10 is withdrawn via line 11 and introduced into the jet condenser 12. The pump 13 draws off the condensate accumulating at the bottom of the jet condenser 12 and urges it into a circulation line which is passed via the cooler 14. Thereupon the accumulated condensate is continuously withdrawn through the line 15 while the cooling medium is again injected into the top portion of the jet condenser 12. Finally, a line sufficiently dimensioned to ensure extremely low flow pressure loss leads from the top of the jet condenser 12 to the first booster stage of the vacuum system 16, 16a.

The fat flowing down the inner walls of the tube bundles in the falling film column 10 accumulates at the bottom thereof and is withdrawn via line 17. As shown, the line 17 extends at a downward inclination along the entire length thereof so as to avoid any accumulations of liquid.

The crude fat withdrawn from the bottom of the falling film column 10, which is already purified to a large extent, reaches the top of the final falling film column 22 via line 17 and is distributed through the distributor thereof to the various trickle passages. Inside the falling film column 22 the final zone of the countercurrent falling film stripping steam distillation zones has been realized. From the top of the falling film column 22 a header 23 leads to the bottom of the falling film column 10, so that there is liquid communication, on the one hand, and vapor communication, on the other hand, between the two falling film columns 10 and 22. In accordance with an important aspect of the invention, trickle passages having a hydraulic equivalent diameter of less than 120 mm, or the equivalent thereof in the case of non-tubular trickle passages, and having a length ranging from 6 to 10 m are provided inside this falling film column 22. Preferably, these trickle passages have a hydraulic equivalent diameter ranging from 50 to 80 mm and a trickle passage length of about 8 m.

In the embodiment described with reference to FIG. 1, the falling film column 22 includes a tube bundle comprising 15 tubes having an inner diameter of 71 mm and a length of 8 m. A heating medium, which, is supplied via the connecting piece 38 and discharged via the connecting piece 37, flows around these tubes. The crude fat flows down the inner walls of the tubes, while the separation of the remaining high-boiling companion substances occurs simultaneously, and finally reaches the bottom of the falling film column 22. Through line 24 the stripping steam, preferably so-called super-pure steam which has been obtained by evaporation of previously distilled and degasified water is supplied.

Finally, the product is withdrawn from the bottom of the falling film column 22 and, after passing the pump intermediate receiver 45, is urged by means of the pump 26 through the heat exchanger 28 where it gives off the greatest part of its sensible heat to the crude fat being processed. A stabilizing agent from a source 29 may be introduced into the product present in the pump intermediate receiver. To ensure good storage stability of the cocoa butter, further indirect cooling is finally effected by means of cooling water in the exchanger 28 down to the lowest possible temperature at which the cocoa butter is just pumpable. Where appropriate, polishing filtration in an inert gas atmosphere may subsequently be provided.

As will be apparent from FIG. 1, the degasification stage is preferably operated under such conditions that the vapors withdrawn therefrom respectively precipitate in the condenser 31 or in a jet condenser of the vacuum system, which jet condenser operates at the appropriate pressure, by means of normal cooling water having a temperature below 60° C. and the condensable phases may be condensed. The resulting condensate, after separation in the phase separator 32, is withdrawn, on the one hand, as aqueous phase through line 33, wherein the aqueous phase together with the condensate of the vacuum system is treated in a per se known manner to meet present environmental requirements. The lighter organic phase precipitating in the separator 32 as upper phase is withdrawn through line 34; on account of the small quantities obtained this is best done periodically instead of continuously.

In accordance with further embodiments of the invention the apparatus explained with reference to FIG. 1 may be modified in various parts. For instance it is possible—as shown by the schematic view of FIG. 2—to design the final zone as a dual zone and to implement the resulting sub-zones in two different falling film columns, viz., to implement the first sub-zone of the final zone in the falling film column 44 and the second sub-zone in the falling film column 22. The falling film column 22 may have the structure explained above with reference to FIG. 1.

Figure 2:
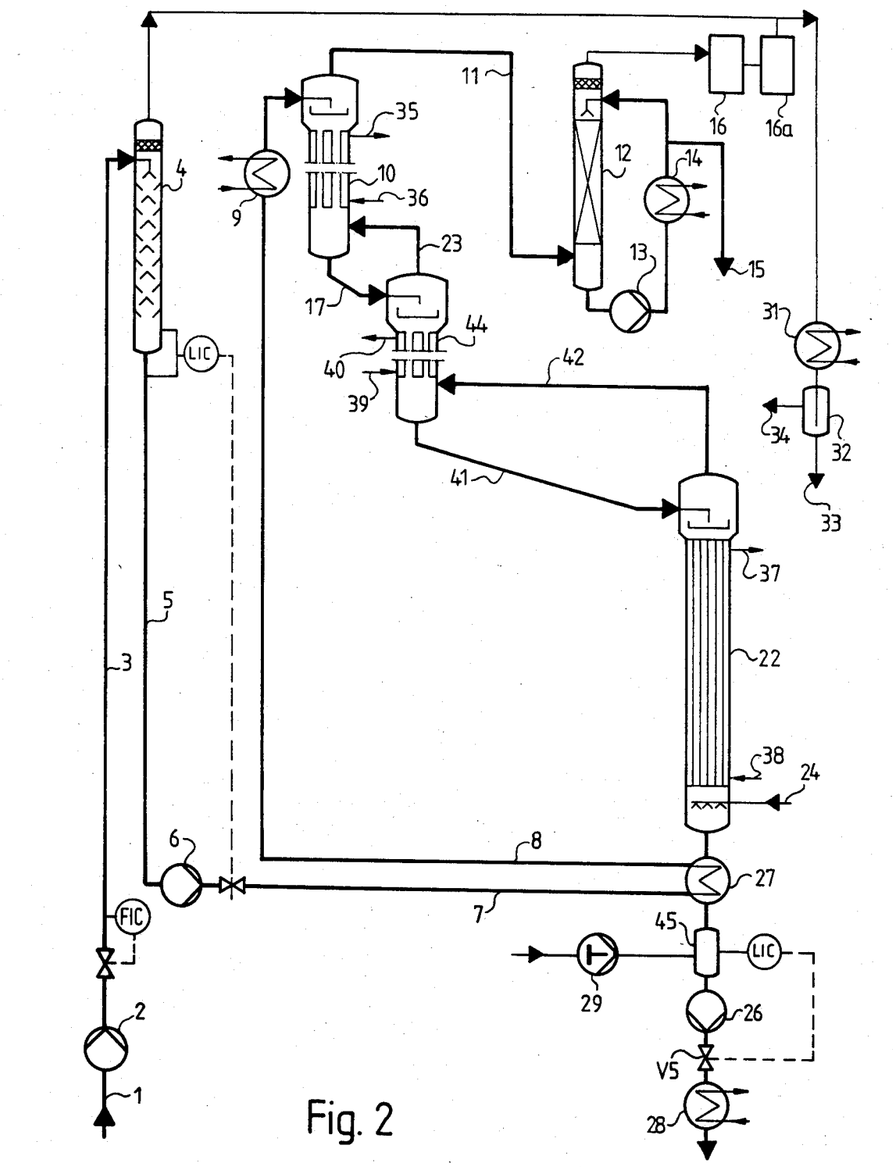
FIG. 2 is a flow diagram with three countercurrent falling film stripping steam distillation zones for carrying out the process according to the invention.

As shown in FIG. 2, in that case the liquid line 17, which is always provided at an inclination, leads from the bottom of the falling film column 10 to the distributor of the falling film column 44, and from the bottom thereof the liquid line 41, which is likewise always provided at an inclination, leads to the distributor of the falling film column 22, from the top of which the vapor header 42 leads to the bottom of the falling film column 44, and from the top of the latter the vapor header 23 leads to the bottom of the falling film column 10.

The falling film column 44 ensures at least two theoretical separating stages. Within the falling film column 44 trickle passages having a hydraulic equivalent diameter ranging from 120 to 80 mm and a length ranging from 2 to 3 m are provided. In one embodiment the trickle passages of the falling film column 44 have hydraulic equivalent diameters of about 84 mm and a length of about 3 m. These trickle passages may be formed, for instance, within the tubes of a tube bundle column. The tube bundles are indirectly heated by means of a heating medium which is supplied via the connecting piece 39 and discharged via the connecting piece 40. The crude fat reaches the bottom of the falling film column 40 whence it is withdrawn through line 41 and suplied to the distributor in the top of the falling film column 22. From the top of the falling film column 44 a vapor header 23 extends to the bottom of the falling film column 10 so that there is also vapor and liquid communication between the serially operating falling film columns 10 and 44.

For the rest, the schematic view of FIG. 2 corresponds to that of FIG. 1, like reference numerals indicating like components, so that reference is made to FIG. 1 as regards any further explanations.

The falling film columns 10, 22 and 44 explained with reference to FIGS. 1 and 2 need not be designed as tube bundle columns.

Figure 3:
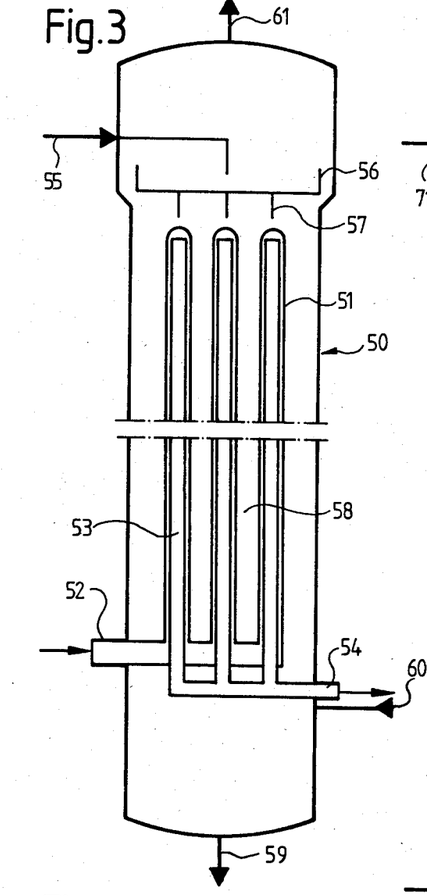
FIG. 3 is a falling film column provided with cartridges, in which the initial stage of the process according to the invention may be carried out.
Figure 4:
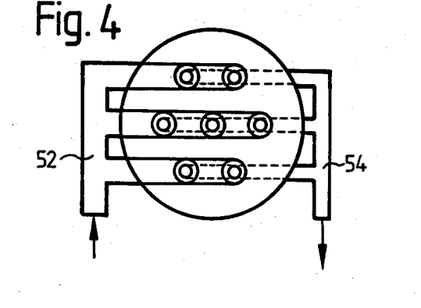
FIG. 4 is a cross-sectional view of the falling film column shown in FIG. 3.

An alternative embodiment of these falling film columns is shown in FIG. 3, and FIG. 4 is the corresponding cross-sectional view. In the falling film column 50 shown in these figures the liquid film trickles down along the outside of cartridges 51 through the interior of which the heating medium is passed. The latter is supplied via the connecting piece 52, collected through tubes 53 having their open ends extending in close proximity to the caps of the cartridges 51, and discharged via the discharge piece 54. The liquid to be processed is fed to the distributor 56 via the inlet 55 and thence flows through inlet passages 57 to the caps of the cartridges 51 to flow down as a thin film along the outer wall thereof. The spacing between adjacent cartridges defines the trickle passage 58 the hydraulic equivalent diameter of which has to be in the range of e.g. 120–150 mm provided that the initial zone of the countercurrent falling film stripping steam distillation zones is realized within the column 50. The processed liquid is withdrawn through line 53 while no significant quantity of liquid collects in the bottom of the column 50. The vapors produced in a falling film column disposed further downstream are introduced via the inlet 60 to the bottom of the column 50 and exit therefrom together with the impurities removed from the processed liquid through the outlet line 61.

The above-described column 50 is especially suited for the physical refining of fat when the release of relatively large amounts of vapor from the downflowing liquid film has to be expected, for instance when the free fatty acid content is in excess of 5% by weight.

Figure 5:
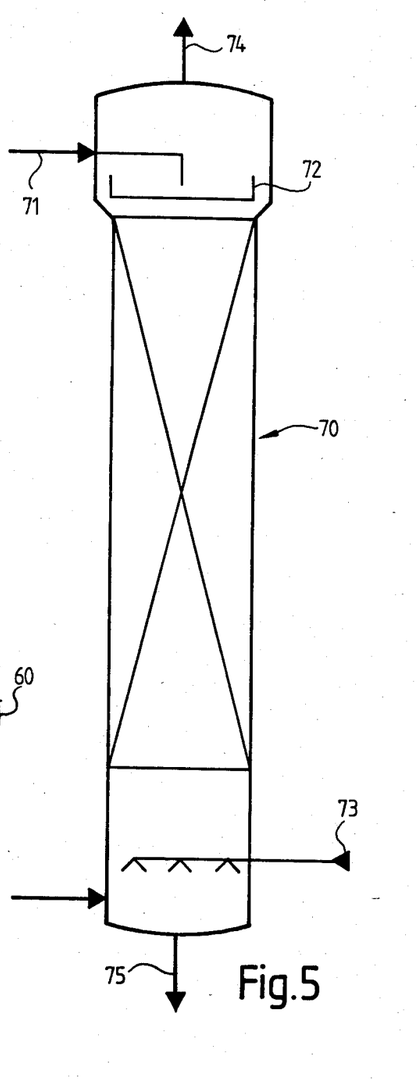
FIG. 5 is a genuine trickle column with low pressure loss, in which the final stage of the process according to the invention may be carried out.

FIG. 5 shows a "genuine" trickle column 70, in which in particular the final zone of the countercurrent falling film stripping steam distillation zones may be realized because the amount of heat required is very low due to the very small evaporation proportion of e.g. 5 kg per ton of fat in case of physical refining and of only 1 kg per ton of fat throughput in case of deodorizing. Such well-insulated high-efficiency "genuine" trickle passages are known and commercially available. Thanks to special packings within these "genuine" trickle passages these ensure 6 to 8 theoretical separating stages over a length of 6 to 8 m and exhibit a pressure loss of merely about 0.1 to 0.5 mbar per each theoretical separating stage. The packing elements consist of obliquely folded lamellas laminated in such a way that open intersecting passages are formed which extend at an inclination to the axis of the column. Thereby the vapors during their passage through the packing are mixed in the direction of the parallel layers. By rotation of successive packings a radial mixing across the entire column cross-section is achieved. The liquid film surface is continuously renewed at the points of intersection of the trickle passages. On account of the extremely low pressure loss in such "genuine" trickle columns it is possible, in accordance with a further aspect of the invention, for the realization of the final zone in such a trickle column to pass the vapors likewise through trickle passages having a hydraulic equivalent diameter of less than 50 mm, or the equivalent thereof in case of non-tubular trickle passages. For instance, the final zone may be realized in such "genuine" trickle passages whose packings have trickle passage diameters as small as 8 mm.

The crude fat already processed in the upstream initial zones is passed through the inlet 71 and reaches the distributor 72 of the trickle column 70. From the distributor 72 the liquid flows onto packings of the type described above. To the bottom of the trickle column 70 stripping steam is supplied through the inlet 73 and is discharged together with the liberated impurities from the top of the trickle column 70 through the discharge line 74. The product is withdrawn through the line 75, in which the control valve $V_5$ (FIG. 1 or FIG. 2) is disposed, while no significant quantity of liquid accumulates in the bottom of the column.

The apparatus according to the invention provides for at least two different countercurrent falling film stripping steam distillation zones, which are realized in different serially operating falling film columns that are in vapor and liquid communication with each other. Each falling film column comprises a distributor for distributing the crude butter onto the walls of the trickle passages or the equivalents thereof, and further trickle passages having a substantially uniform hydraulic equivalent diameter, or the equivalent thereof in case of non-tubular trickle passages, and finally a liquid collector at the lower end of the trickle passages. The liquid collectors are designed and arranged in such a manner that no significant liquid level is accumulated therein but the resulting liquid content is caused substantially only by the wetting of the existing walls.

Different falling film columns exist when the hydraulic equivalent diameters, or the equivalent thereof in case of non-tubular (non-cylindrical) trickle passage diameters, differ by more than 10 mm. The trickle passage diameters of the final zone are less than 120 mm and preferably range from 50 to 80 mm. With smaller trickle passage diameters the pressure loss will be too high in view of the stripping steam required and the trickle passage length of about 4 to 10 m. If the final zone is of dual-zone type, the first sub-zone (realized in the falling film column 44 according to FIG. 2) preferably has trickle passage diameters ranging from 120 to 150 mm; the hydraulic equivalent diameters of the second sub-zone (realized in the falling film column 22 according to FIG. 2) will then range from 80 to 50 mm. The trickle passage diameters of the initial zone 10 range from 120 to 150 mm.

These different countercurrent falling film stripping steam distillation zones may be realized in separate falling film columns. In that case a line 17 or 41, respectively, which always extends at an inclination, will communicate the top of the succeeding falling film column 22 or 44, respectively, to the bottom of the preceding falling film column 44 or 10, respectively.

Figure 6:
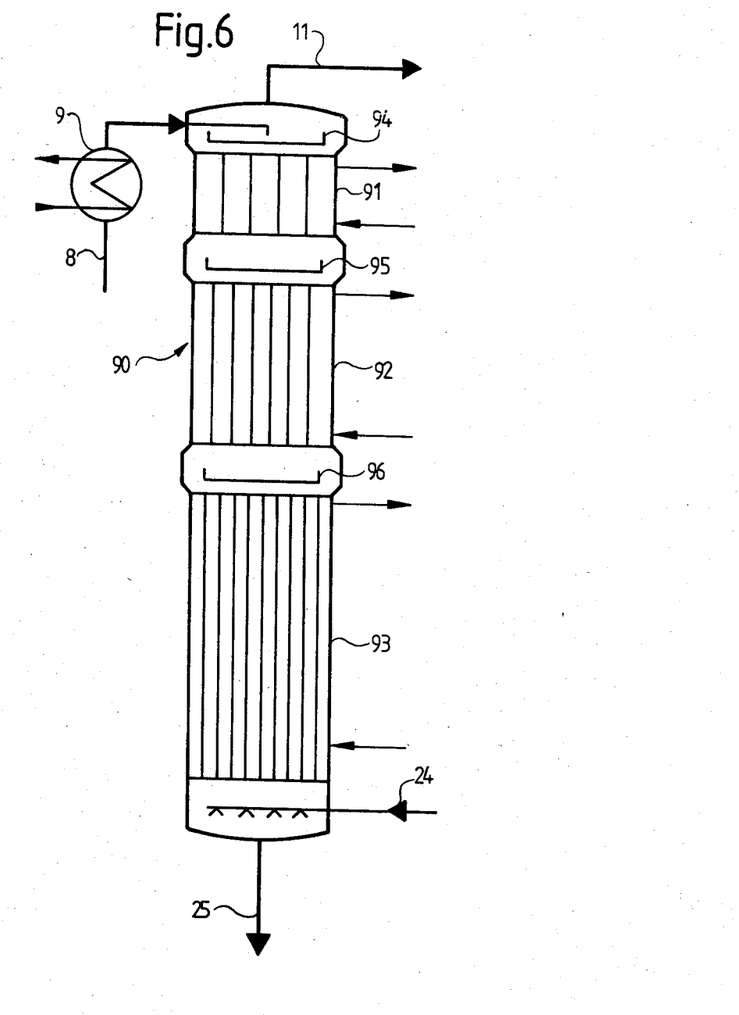
FIG. 6 is a schematic view of a column section in which three different falling film columns for realizing the initial zone, the first and the second sub-zone of the final zone are integrated.

According to an alternative embodiment the different falling film columns for realizing the initial and the final zones including the optionally provided two sub-zones of the final zone of the countercurrent falling film stripping steam distillation zones may be integrated in a single column section 90, as is shown schematically in FIG. 6.

The column section 90 has three different falling film columns 91, 92 and 93 integrated therein. The initial zone is realized in the falling film column 91, and the two sub-zones of the final zone of the countercurrent falling film stripping steam distillation zones are realized in the two falling film columns 92 and 93. It is schematically indicated that, viewed in the direction of liquid flow, the hydraulic equivalent diameters of the trickle passages in the falling film columns 91, 92 and 93 have progressively decreasing values in order to satisfy the above-specified conditions. Suitably, the number of tubes per falling film column increases in the direction of the downflowing liquid so that at least a constant, preferably an increasing total circumferential surface is realized. Every single falling film column 91, 92 and 93 is provided with an inlet and an outlet for a heating medium, as indicated schematically. In operation, the already preheated liquid supplied via line 8 is heated to the working temperature in the high-temperature heat exchanger 9 and then reaches the distributor 94 in the falling film column 91. The liquid arriving at the bottom of the falling film column 91 is immediately redistributed through the distributor 95 to the trickle passages of the falling film column 92, while no significant liquid level is accumulated. The same happens at the bottom of the falling film column 92, where the liquid is again distributed by the distributor 96 to the trickle passages of the falling film column 93. From the bottom of the column 93 the liquid is finally withdrawn via line 25. Through line 24 stripping steam is fed to the bottom of the falling film column 93, which after passage through the various falling film columns 93, 92 and 91 is finally withdrawn together with the impurities separated from the liquid at the top of the falling film column 91 via the header 11.

This structure, in which all falling film columns are integrated in a single column section, is preferred because the connecting lines are extremely short whereby the residence time of the cocoa butter in the high-temperature part of the apparatus is in turn reduced. With this embodiment the residence time of the individual liquid particles in the high-temperature part of the apparatus may be kept below 40 sec. although three separate, serially operating countercurrent falling film stripping steam distillation zones in vapor and liquid communication with each other are provided. In spite of these three different zones the difference between the stripping steam pressure at the bottom of the column 93 and the (stripping steam plus vaporous impurities) pressure in the top of the falling film column 91 is very low and amounts e.g. to merely 1.5 mbar.

If flash treatment is provided—e.g. because the crude cocoa butter contains more than 5% by weight of free fatty acids and other high-boiling components—the flash vessel 46 (see FIG. 1a) is suitably disposed between the high-temperature heat exchanger 9 and the first falling film column 10. Preferably, this flash vessel is disposed above the top of said first falling film column 10 so that the flashed mixture reaches the distributor of the first falling film column 10 merely under the action of its own weight. The vapors withdrawn from the flash vessel 46 are supplied through line 47 to the bottom of the condensation system 12. The flash zone also may be realized within a falling film or trickle column—for instance within a falling film column 50 (length about 1 to 2 m) explained with reference to the FIGS. 3 and 4 and provided with cartridges 51; however, no stripping steam is supplied thereto. Apart from this structure, simple and commonly used flash vessels 46 of known type may be employed. According to a further advantageous aspect of the invention the flash vessel 46 is also integrated in the column section 90 (not shown in FIG. 6).

The following examples will further explain the invention without limiting the scope thereof.

EXAMPLE 1

For the physical refining of cocoa butter an apparatus according to FIG. 1 is designed for a flow rate of 2,000 kg/h of cocoa butter. The content of free fatty acids and other high-boiling components in the cocoa butter is about 5% by weight.

The cocoa butter is taken from the storage tank 1 at a temperature of 60° C. The top of the degasification stage 4 is operated at a pressure of 199.5 mbar. In the heat exchanger 27 the degasified, but still water-containing fat (mean water content 0.1% by weight) is heated to 175° C. by heat exchange with the product withdrawn from the bottom of the falling film column 22. The amount of heat to be exchanged in the heat exchanger 27 is 500,000 kJ/h (120,000 kcal/h). During this step the finished oil is cooled down to 84° C. and may then be cooled down to 60° C. by means of normal cooling water in the final cooler 28 to improve the storage stability, wherein 93,000 kJ/h have to be dissipated by means of cooling water having an inlet temperature of e.g. 40° C. and an outlet temperature of 50° C. The crude butter, which has been heated to 175° C. in the heat exchanger 27, is heated to 190° C. in the high-temperature heat exchanger 9, which requires 72,000 kJ/h. At this temperature the crude fat is charged to the top distributor of the falling film column 10, in which the principal separation of the volatile companion substances takes place down to a residual free fatty acid content of about 0.5% by weight in the down-flowing fat. The falling film column 10 includes 8 tubes having an inner diameter of 133.1 mm and a vertical length of 3 m, the crude fat flowing down along the inner walls thereof. The thickness of the fat film is about 0.45 mm, and it has a Reynold's number of about 126.5. With a flow rate of 2,000 kg/h of crude cocoa butter and a stripping steam throughput of 1.8 to 2% by weight based on the feed there is merely a pressure loss of 0.2 mbar at a working pressure of 1.99 mbar in the top of the falling film column 10. The heating medium—HT-oil—supplied through the connecting piece 36 is supplied at a temperature of from 200° to not more than 205° C. so that the oil discharged from the bottom of the column 10 has a temperature of not more than 200° C.

The cocoa butter flowing down from the first countercurrent falling film stripping steam distillation zone 10 having trickle passage diameters of 133.1 mm through a continually inclined line 17 is charged onto the distributor of the falling film column 22 at a temperature of about 200° C. This falling film column, which is designed as an upright tube bundle, comprises 15 tubes hving an internal diameter of 72 mm and a length of 8 m.

The liquid flowing down the inner walls of the tubes has a Reynold's number around 167; the thickness of the liquid film is about 0.425 mm. The heating medium is HT-oil at a temperature of 205° C. The cocoa butter discharged from the lower portion of the falling film column 22 at a temperature of not more than 200° C. has a residual acid content of less than 0.04%.

Through the inlet 36 to 40 kg of super-pure steam are supplied per hour. There results a pressure loss of 0.94 mbar in the falling film column 22, so that the total pressure loss for both falling film columns 22 and 10 is merely 1.14 mbar.

The addition of a stabilizer (citric acid) takes place by means of a metering pump 29 into the pump intermediate receiver 45 disposed downstream of the heat exchanger 27.

EXAMPLE 2

For the physical, refining of cocoa butter a three-stage apparatus according to FIG. 2 is used for a flow rate of 2,000 kg/h of cocoa butter. The free fatty acid content of the charged cocoa butter is again about 5% by weight.

Unless otherwise stipulated, the process is carried out substantially analogously to example 1.

Similar to example 1, the previously degasified and partially dehydrated cocoa butter is charged at a working temperature of 190° C. to the distributor of the topmost falling film column 10. In the present case this is again a tube bundle column including 8 tubes with an inner diameter of 133.7 mm and a vertical tube length of 3 m. The working pressure at the top of the column 10 is maintained at 1.99 mbar. By means of the falling film column 10 the principal proportion of free fatty acids is separated by distillation as in example 1 except for a residual content of 0.5% by weight in the discharged fat.

The cocoa butter, which exits from the bottom of the column 10 via line 17 at a temperature of about 200° C. and with a minimum liquid content, i.e., substantially without any liquid level, is charged at this temperature to the distributor disposed in the top of the falling film column 44. The falling film column 44 also is a tube bundle column including 12 tubes of an inner diameter of 83.9 mm and a vertical length of 3 m. In this zone the free fatty acid content is decreased by a further 8 kg per hour.

The cocoa butter exiting at about 200° C. from the bottom of the column 44 through the line 41, again practically without any liquid level and thus without any significant liquid content, is charged at this temperature onto the distributor of the falling film column 22, which is likewise an upright film tube column including 14 tubes having an internal diameter of 71.1 mm and a vertical length of 5 m.

The physically refined and deodorized cocoa butter is withdrawn through line 25 at a temperature of not more than 200° C. and is cooled by heat exchange with the crude butter in the heat exchanger 27 to 84° C., during which step the feed is heated up to 175° C. Subsequently it is cooled down to 60° C. in the heat exchanger 27. Here, too, a stabilizing agent is added by means of a metering pump 29 to the pump intermediate receiver 45 disposed downstream of the heat exchanger 27.

EXAMPLE 3

For the physical refining of particularly high-grade chocolate raw materials of the cocoa butter type the following working conditions of a two-stage apparatus according to FIG. 1 have proven to be especially suitable.

Unless otherwise stated, the process is carried out substantially analogously to example 1.

In the present case the cocoa butter, which initially contained 5% by weight of free fatty acids and other high-boiling components, after degasification and partial dehydration is charged at a temperature of 185° C. to the distributor of the uppermost film column 10 which is equipped with 13 tubes having an internal diameter of 133.7 mm and a vertical tube length of 3 m. The working pressure in the top of the column 10 is set to 1.33 mbar. By means of the film column 10 the principal proportion of free fatty acids and volatile impurities is separated as in example 1 except for a residual content of 0.5% by weight in the discharged fat.

The cocoa butter exiting from the bottom of the column 10 at a temperature of about 195° C. and with a minimum liquid content, i.e., practically without any liquid level, through line 17 is charged at a temperature of about 195° C. to the distributor of the falling film column 22. This film column in the form of an upright tube bundle comprises 16 tubes having an internal diameter of 83.9 mm. The liquid flowing down the respective inner walls of the tubes has a Reynold's number of 111.8, the film thickness of the downflowing liquid film being 0.46 mm. The heating medium may be HT-oil the inlet temperature of which must not be in excess of 200° C. The cocoa butter discharged from the lower portion of the film column 22 at a temperature of not more than 195° C. has a residual content of <0.04%. Through the inlet line 24, 30 to 35 kg of super-pure steam per hour are supplied as stripping medium for the separation of the high-boiling components including the free fatty acid proportions. There results an overall pressure loss of 1.11 mbar, of which 0.2 mbar occur in the first stage and 0.91 mbar occur in the second stage.

Below, the most important parameters for the physical refining of cocoa butter by means of a two-stage type or three-stage type countercurrent film apparatus are specified.

Working conditions for physically refining 2,000 kg/h of cocoa butter containing 5% of free fatty acids at a
(a) working pressure of 1.99 mbar in the top of the first stage which is operated at an inlet temperature of 190° C.

| falling film column (No.) | tube diameter (mm) | tube length (m) | number of tubes | $N_{Re}$ of vapor | $N_{Re}$ of liquid | film thickness (mm) | residence time (sec.) | pressure loss (mbar) |
|---|---|---|---|---|---|---|---|---|
| (a1) physical refining in two film stages according to FIG. 1 | | | | | | | | |
| 10 | 133.7 | 3 | 8 | 4142 | 126.5 | 0.45 | 6.60 | 0.26 |
| 22 | 71.1 | 8 | 15 | 1018 | 167.6 | 0.425 | 17.22 | 1.25 |
| (a2) physical refining in three film stages according to FIG. 2 | | | | | | | | |
| 10 | 133.7 | 3 | 8 | 4142 | 126.5 | 0.45 | 6.60 | 0.26 |
| 44 | 83.9 | 3 | 12 | 1078 | 167.6 | 0.43 | 6.17 | 0.40 |
| 22 | 71.1 | 5 | 14 | 836 | 168.6 | 0.43 | 10.21 | 0.84 |
| (b) working pressure of 1.33 mbar in the top of first stage according to example 3 in a two-stage film apparatus according to FIG. 1 | | | | | | | | |
| 10 | 133.7 | 3 | 13 | 3381 | 73.9 | 0.40 | 9.6 | 0.20 |
| 22 | 83.9 | 9 | 16 | 827 | 111.8 | 0.46 | 26.5 | 0.91 |

I claim:

1. A process for removing lower boiling components from at least one member selected from the group of cocoa butter, cocoa butter substitutes, or mixtures thereof; employing continuous countercurrent falling film stripping steam distillation in an externally imposed temperature field, which comprises heating said at least one member, causing said member, when heated in a liquid state, to flow down as a thin film having a film thickness of less than 1.0 mm along the walls of substantially vertically disposed surfaces forming trickle passages, maintaining at least a part of said passages at a higher temperature than that of the downflowing liquid, and passing steam countercurrently to said liquid through said trickle passages; which comprises providing at least two serially operating countercurrent falling film stripping steam distillation zones being in vapor and liquid communication with each other and providing an unrestricted vapor flow connection; and wherein the hydraulic equivalent diameters of the trickle passages in a final distillation zone downstream in the direction of the downflowing liquid are smaller than the hydraulic equivalent diameters fo the trickle passages of the initial zone(s) located upstream of said final distillation zone; charging said at least one member to the top of the initial zone at a temperature ranging from 150° C. to 200° C.; maintaining the temperature of desired product in the bottom of the final distillation zone at a maximum of 10° K. in excess of the inlet temperature to the initial zone; and maintaining the inlet temperatures of the heating medium which is passed in countercurrent flow to the downflowing liquid film below 250° C. and a maximum of 10° K. above the temperature of said desired product; maintaining the working pressure in the top of the initial zone below 2.0 mbar and maintaining the working pressure in the bottom of the final distillation zone no more than 1.6 mbar in ecess of that in the initial zone; providing liquid accumulators in the serially operating zones; and avoiding in the liquid accumulators of the serially operating zones, the formation of any significant liquid level; and supplying the stripping steam exclusively to the bottom of said final distillation zone in an amount of 2 kg to 10 kg of steam per 100 kg of charged liquid.

2. The process of claim 1 which comprises maintaining the Reynold's number of the downflowing liquid film between 50 and 190.

3. The process of claim 1 which comprises maintaining the Reynold's number of the downflowing liquid film between 100 and 180.

4. The process of claim 1 which comprises providing a higher Reynold's number for the liquid film in succeeding countercurrent falling film stripping steam distillation zone as compared to that in the preceding zone in the direction of the downflowing liquid.

5. The process of claim 1 which comprises charging the liquid to the top of the initial zone at a temperature ranging between 160° and 190° C.

6. The process of claim 1 which comprises maintaining the temperature of the product in the bottom of the final zone at a maximum of 5° K. in excess of the inlet temperature in the initial zone; and maintaining the inlet temperature of the heating medium, which is passed in countercurrent flow to the downflowing film, at a maximum of 5° C. in excess of the temperature of the product and below 195° C.

7. The process of claim 1 which comprises supplying the stripping steam in an amount of from 3 to 8 kg of steam per 100 kg of liquid feed.

8. The process of claim 1 wherein the hydraulic equivalent diameters of trickle passages associated with different countercurrent falling film stripping steam distillation zones differ by at least 10 mm.

9. The process of claim 1 which comprises providing at least six theoretical separation stages in the final distillation zone and flowing the vapors through trickle passages having a hydraulic equivalent diameter of less than 120 mm.

10. The process of claim 9 wherein said hydraulic equivalent diameter is less than 80 mm.

11. The process of claim 9 which comprises subdividing the final zone into two sub-zones; flowing the vapors in the first sub-zone directly adjacent the initial zone through trickle passages having a hydraulic equivalent diameter of 80 to 120 mm; and flowing the vapors in the seocnd sub-zone directly adjacent to said first sub-zone throug trickle passages having a hydraulic equivalent diameter of less than 80 mm.

12. The process of claim 11 wherein said trickle passages are tubular.

13. The process of claim 11 wherein said trickle passages are non-tubular.

14. The process of claim 1 which comprises keeping the pressure drop through all countercurrent falling film stripping steam distillation zones kept less than 1.6 mbar.

15. The process of claim 1 which comprises keeping the pressure drop through all countercurrent falling film stripping steam distillation zones less than 1.2 mbar.

16. The process of claim 1 which comprises maintaining the thickness of the liquid flim between 0.35 and 0.55 mm.

17. The process of claim 1 which comprises maintaining the temperature of the trickle passages in the initial zone at most 10° K. in excess of the liquid film discharge temperature, and maintaining the temperature of the trickle passages in the final zone at about the liquid film discharge temperature.

18. The process of claim 17 which comprises maintaining the temperature of the trickle passages in the inlet zone 2°-4° K. in excess of the film discharge temperature.

19. The process of claim 1 which comprises keeping the total residence time of specific liquid particles in the initial zone and in the final zone below 40 seconds.

20. The process of claim 1 which comprises degasifying the liquid to be treated in a pretreatment stage under a pressure of 60 to 280 mbar and at a temperture between 40° and 100° C. and introducing said liquid into the initial zone with a water content of about 0.05 to 0.2% by weight.

21. The process of claim 1 wherein the liquid to be treated has a relatively high proportion of free fatty acids and other low-boiling components, and which comprises carrying out a flash treatment immediately before entry into the initial distillation zone, and wherein said flash treatment is conducted at substantially the same working pressure as in the initial zone; and separating and condensing the vapors released upon the flashing.

22. The process of claim 1 which comprises introducing a complexing agent into the bottom of the final zone.

23. The process of claim 1 which comprises employing as the steam, super-pure steam produced from previously distilled and degasified water.

24. The process of claim 1 which comprises introducing a complexing agent into the liquid withdrawn therefrom which is partially cooled.

* * * * *